(12) United States Patent
Verma et al.

(10) Patent No.: US 7,299,301 B1
(45) Date of Patent: *Nov. 20, 2007

(54) METHOD AND ARCHITECTURE FOR LOGICAL AGGREGATION OF MULTIPLE SERVERS

(75) Inventors: Rohit Verma, Schaumburg, IL (US); Janakiraman Senthilnathan, Mount Prospect, IL (US)

(73) Assignee: 3Com Corporation, Marlborough, MA (US)

( * ) Notice: Subject to any disclaimer, the term of this patent is extended or adjusted under 35 U.S.C. 154(b) by 590 days.

This patent is subject to a terminal disclaimer.

(21) Appl. No.: 10/657,778

(22) Filed: Sep. 8, 2003

Related U.S. Application Data

(63) Continuation of application No. 09/514,108, filed on Feb. 28, 2000, now Pat. No. 6,654,792.

(51) Int. Cl.
*G06F 15/16* (2006.01)
(52) U.S. Cl. .................. 709/249; 709/223; 370/389
(58) Field of Classification Search ................ 709/200, 709/223, 224, 238, 227, 245; 370/389
See application file for complete search history.

(56) References Cited

U.S. PATENT DOCUMENTS 5,528,595 A 6/1996 Walsh et al. ............. 380/85.13

(Continued)

OTHER PUBLICATIONS

Dial-in virtual private networks using layer tunneling Malkin, G.S.; Local Computer Networks, 1997. Proceedings., 22nd Annual Conference on Nov. 2-5, 1997 pp. 555-561.*

IP access service provision for broadband customers Komisarczuk, P.; Services Over the Internet—What Does Quality Cost? (Ref. No. 1999/099), IEE Colloquium on Jun. 23, 1999 pp. 5/1-5/4.*

(Continued)

*Primary Examiner*—Thong Vu
(74) *Attorney, Agent, or Firm*—McDonnell Boehnen Hulbert & Berghoff LLP

(57) ABSTRACT

A system and method are shown for multiple network devices to operate as a single logical entity for serving tunnel connections. A cluster master device is connected to a multiple network devices through a local area network (LAN). The cluster master device is also connected to a wide area network (WAN) and has a master address that is unique on the WAN. The cluster master device receives a tunnel connection set-up request (SCCRQ) from the WAN that is addressed to the master address. The cluster master device selects one of the multiple network devices and forwards the SCCRQ message over the LAN to the selected network device. The selected network device selects a tunnel identification number that is unique for the tunnel connection on the selected network device and places the tunnel identification number into a source tunnel identification field of a connection set-up reply (SCCRP). The selected network device also places its own global address on the WAN into a source address field of the SCCRP, a value from a source address field of the SCCRQ into a destination address field of the SCCRP, and a value from a source tunnel identification field of the SCCRQ into a destination tunnel identification field of the SCCRP. The selected network device then transmits the SCCRP message onto the WAN. Alternatively, the multiple network devices do not have global addresses on the WAN and the SCCRP is transmitted over the LAN to a network address translation (NAT) server that substitutes its own address into the source address field of the SCCRP and retransmits the SCCRP onto the WAN. The NAT creates a table from the information in the SCCRP that it uses to translate and route subsequent packets between the selected network device and the device that requested the tunnel connection.

20 Claims, 5 Drawing Sheets

U.S. PATENT DOCUMENTS

| | | | | |
|---|---|---|---|---|
| 5,740,164 | A * | 4/1998 | Liron | 370/316 |
| 6,006,259 | A * | 12/1999 | Adelman et al. | 709/223 |
| 6,119,171 | A | 9/2000 | Alkhatib | |
| 6,330,562 | B1 | 12/2001 | Boden et al. | |
| 6,333,931 | B1 * | 12/2001 | LaPier et al. | 370/385 |
| 6,393,482 | B1 | 5/2002 | Rai et al. | |
| 6,405,251 | B1 * | 6/2002 | Bullard et al. | 709/224 |
| 6,415,329 | B1 | 7/2002 | Gelman et al. | |
| 6,446,200 | B1 | 9/2002 | Ball et al. | |
| 6,449,272 | B1 * | 9/2002 | Chuah et al. | 370/389 |
| 6,452,920 | B1 * | 9/2002 | Comstock | 370/349 |
| 6,453,419 | B1 | 9/2002 | Flint et al. | |
| 6,463,475 | B1 * | 10/2002 | Calhoun | 709/227 |
| 6,473,798 | B1 * | 10/2002 | Grosser et al. | 709/224 |
| 6,519,254 | B1 * | 2/2003 | Chuah et al. | 370/389 |
| 6,535,493 | B1 * | 3/2003 | Lee et al. | 370/329 |
| 6,591,306 | B1 * | 7/2003 | Redlich | 709/245 |
| 6,633,563 | B1 * | 10/2003 | Lin et al. | 370/389 |
| 6,636,491 | B1 * | 10/2003 | Kari et al. | 370/328 |
| 6,640,251 | B1 * | 10/2003 | Wiget et al. | 709/238 |
| 6,687,732 | B1 * | 2/2004 | Bector et al. | 709/200 |
| 6,832,322 | B1 * | 12/2004 | Boden et al. | 726/15 |
| 6,963,582 | B1 * | 11/2005 | Xu | 370/466 |

OTHER PUBLICATIONS

Mobile PPP www.ietf.org/proceedings/98dec/I-D/draft-ietf-pppext-mppp-00.txt.*

L2TP Security Extensions fro Non-IP networks quimby.gnus.org/internet-drafts/draft-ietf-pppext-12tp-sec-04.txt.*

W. Townsley et al., "Layer Two Tunneling Protocol L2TP", Network Working Group, RFC 2661, Aug. 1999, pp. 1-80.

Rigney et al., *"Remote Authentication Dial In User Service (RADIUS)"*, Network Working Group, RFC 2138, Apr. 1997, pp. 1-65.

C. Perkins, "IP Mobility Support", Network Working Group, RFC 2002, Oct. 1996, pp. 1-79.

W. Simpson, *"The Point-To-Point Protocol (PPP)"*, Network Working Group, RFC 1661, Jul. 1994, pp. i-52.

W. Simpson, "PPP In HDLC-Like Framing", Network Working Group, RFC 1662, Jul. 1994, pp. i-25.

D. Rand, "PPP Reliable Transmission", Network Working Group, RFC 1663, Jul. 1994, pp. 1-8.

S. Deering, "Host Extenions for IP Multicasting", Network Working Group, RFC 1112, Aug. 1989, pp. 1-17.

W. Fenner, "Internet Group Management Protocol, Version 2", Network Working Group, RFC 2236, Nov. 1997, pp. 1-24.

Mobile IP at IETF 43—Parkins (1998) ; www.svrloc.org/~charliep/txt/mc2r_98d/mc2r_98d.ps.

NETBuilder Family Software Version 11.1 Features; http://support/3com/com/infodeli/tools/bridrout/u_guides/html/nb111/family/features/ras.htm, 1992.

Remote Access Software Version 5.1 Release Notes (118362-A Rev. A); www25.nortelnetworks.com/library/tpubs/p...c51/118362A.PDF, 1997.

* cited by examiner

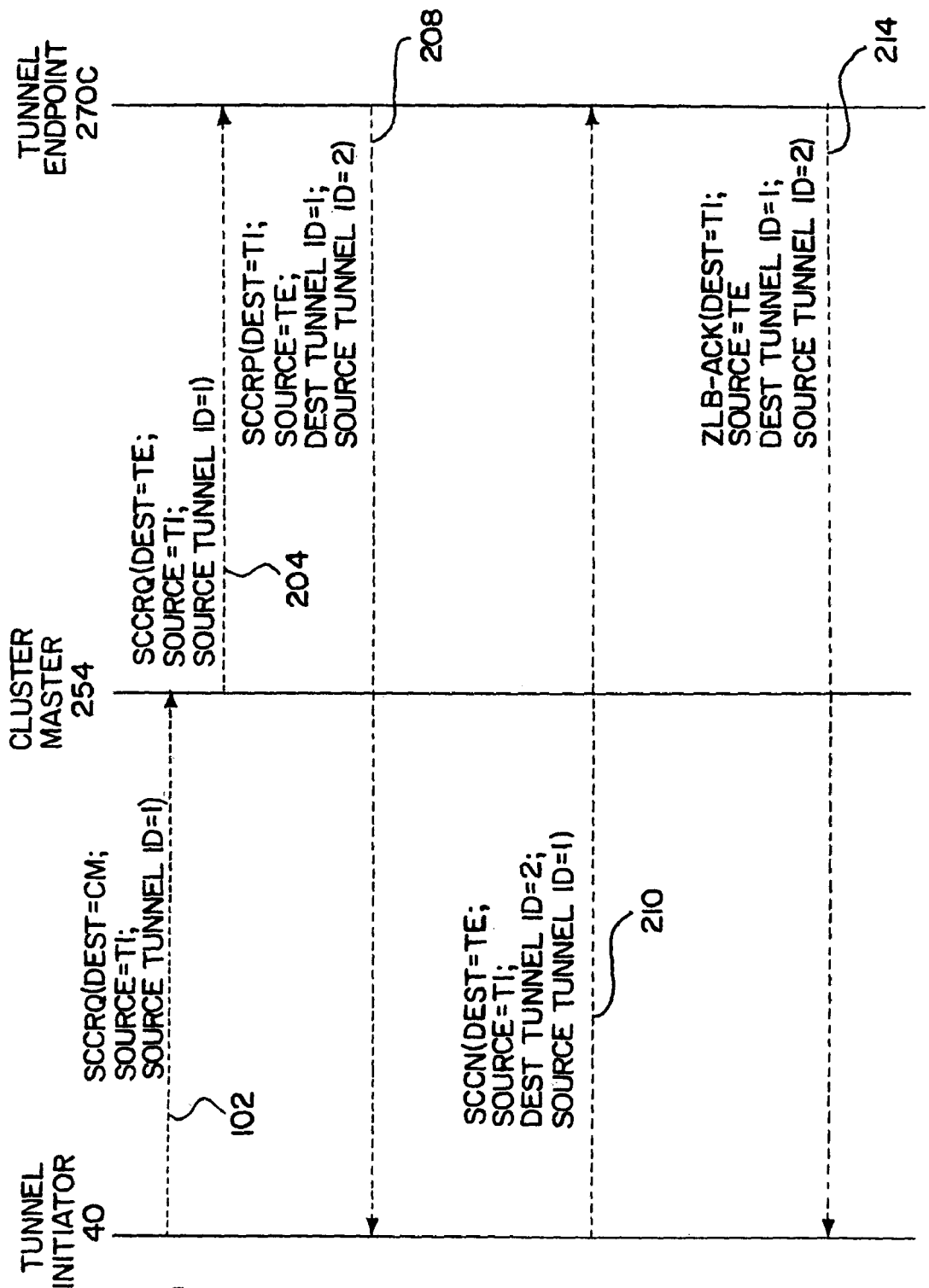

METHOD AND ARCHITECTURE FOR LOGICAL AGGREGATION OF MULTIPLE SERVERS

CROSS REFERENCE TO RELATED APPLICATION

The present patent application is a continuation application of U.S. patent application Ser. No. 09/514,108, filed on Feb. 28, 2000, the full disclosure of which is incorporated herein by reference.

FIELD OF INVENTION

The present invention relates to data communications. More specifically, it relates to the transmission of packets in a point to point communication link.

BACKGROUND

Connection oriented point-to-point communication links, such as a Layer 2 Tunneling Protocol (L2TP) tunnel, are an increasingly common feature of network infrastructures. Tunnels are prearranged connections established by agreement between internet service providers (ISPs). See Request for Comment (RFC) 2661 and *Layer Two Tunnelling Protocol* (L2TP), A. Valencia, et al., draft-ietf-pppext-12tp-16.txt, June 1999, herein incorporated by reference, available from the Internet Engineering Task Force (IETF) at www.ietf.org for more information. FIG. 1 shows an architecture 10 that illustrates two L2TP tunnels 56 and 58 from tunnel initiators 30 and 40, respectively, established through a public IP network 70 to a tunnel endpoint server 50.

An L2TP tunnel typically provides a conduit for communications between client devices served by the tunnel initiators and a server device served by tunnel endpoint 50. Typically, a single tunnel slot provides the communication link between a client and server.

When a client device establishes a dial-up connection with a tunnel initiator (TI) 30 or 40, then the TI typically recognizes the client device as a tunnel client by means of an authentication protocol, such as RADIUS, see Request For Comment (RFC) 2138, herein incorporated by reference, or by other means for identifying the client, such as through the use of a mobile identification number (MIN) in mobile applications or, for protocols not directed toward mobile applications, the use of a Dial-up Number Information Service (DNIS) or Automatic Number identification (ANI). The authentication process can be adapted to provide an address for a tunnel endpoint device for the client. Alternatively, the client device itself may provide the tunnel endpoint address. In still another approach, each TI may have a pre-constructed table containing entries that associate a client device identifiers with a tunnel endpoint address value. Independent of how the tunnel endpoint address is obtained, the tunnel initiator will establish a tunnel connection to the tunnel endpoint device.

Tunnel endpoint devices are typically stand-alone devices that operate independently of other tunnel endpoints. As a result, the tunnel endpoint devices are difficult to scale in order to cope with high levels of traffic to a server device connected to the tunnel endpoint device. In addition, with a single tunnel endpoint device serving a given server device, failure of the tunnel endpoint device can block all traffic to the server.

Thus, the need remains for a method for providing multiple tunnel endpoint devices that can serve a single server device.

SUMMARY OF THE INVENTION

In accordance with preferred embodiments of the present invention, some of the problems associated with combining multiple tunnel endpoint devices are overcome.

An embodiment of a system, according to the present invention, for terminating tunnel connections includes a first network and a plurality of network devices. Each network device has a network interface coupled to the first network and has a local address that is unique on the first network. Each network device is configured to receive a connection request message having a source address field, a destination address field, and a source tunnel identification field and, responsive thereto, construct a connection reply message having a source address field set to the local address of the network device, a destination address field set to the value of the source address field of the connection request message, a source tunnel identification field set to a value selected by the network device, and a destination tunnel identification field set to the value of the source tunnel identification. The connection reply message then being transmitted onto the first network. A master network device has a first interface coupled to the first network and a second interface for communicating with a second network. The master network device also has a first global address that is unique on the second network. The master network device is configured to receive tunnel connection request messages having the first global address in the destination field from the second network and, for each connection request message received, select one of the plurality of network devices, insert the local address for the selected network device into the destination field of the received connection request message, and forward the received connection request message to the selected network device over the first network. A network address translation device has a first network interface coupled to the first network and a second network interface for communicating with the second network. The network address translation device also has a second global address that is unique on the second network. The network address translation device is configured to receive the connection reply messages and, responsive thereto, create a table entry for each connection reply message that includes the value of the destination address field and the value of the source address field for the received connection reply message. The network address translation device is also configured to insert the second global address into the source address field of the connection reply message and transmit the connection reply message onto the second network.

Another embodiment of a system for terminating tunnel connections, according to the present invention, includes a first network along with a plurality of network devices, each network device having a first network interface coupled to the first network and having a local address that is unique on the first network. Each network device also has a second network interface for communicating with a second network and has a global address that is unique on the second network. Each network device is configured to receive a connection request message on the first network interface having a source address field, a destination address field, and a source tunnel identification field and, responsive thereto, construct a connection reply message having a source address field set to the global address of the network device, a destination address field set to the value of the source address field of the connection request message, a source tunnel identification field set to a value selected by the network device, and a destination tunnel identification field set to the value of the source tunnel identification field of the connection request message. Each network device is further configured to transmit the connection reply message over the second network interface onto the second network. A master network device has a first interface coupled to the first network and a second interface for communicating with the second network. The master network device has a master global address that is unique on the second network. The master network device is configured to receive tunnel connection request messages having the master global address in the destination field from the second network and, for each connection request message received, select one of the plurality of network devices, insert the local address for the selected network device into the destination address field of the received connection request message, and transmit the received connection request message as modified over the first network interface onto the first network.

An embodiment of a method for terminating tunnel connections, according to the present invention, calls for transmitting a tunnel connection set-up request from a first network device having a first global address value to a second global address value, the tunnel connection set-up request including a source address field containing the first global address value, a source tunnel identifier field containing a first tunnel identifier value assigned by the first network device, and a destination address field containing the second global address value. The method also calls for receiving the tunnel connection set-up request at a second network device corresponding to the second global address value, selecting one of a plurality of tunnel endpoint servers coupled to the second network device, and forwarding the tunnel connection set-up request to the selected tunnel endpoint server. Upon receiving the tunnel connection set-up request in the selected tunnel endpoint server, the method sets forth forming a tunnel set-up reply by inserting the value from the source address field of the tunnel set-up request into a destination address field of the tunnel set-up reply, inserting the value from the source tunnel identifier field of the tunnel set-up request into a destination tunnel identifier field of the tunnel set-up reply, selecting a second tunnel identifier value for the tunnel connection, inserting the second tunnel identifier value into a source tunnel identifier field of the tunnel set-up reply, and inserting an address value for the selected tunnel endpoint server into a source address field of the tunnel set-up reply. The method then provides for transmitting the tunnel set-up reply to the first network device over the first network.

The foregoing and other features and advantages of a preferred embodiment of the present invention will be more readily apparent from the following detailed description, which proceeds with references to the accompanying drawings.

BRIEF DESCRIPTION OF THE DRAWINGS

The present invention is described in the context of an embodiment of the invention with reference to the following drawings, wherein:

FIG. 5 is a message sequence diagram illustrating an example of message traffic, according to the present invention, related to establishing a tunnel control session between a tunnel initiator and a tunnel endpoint in the architecture of FIG. 4.

DETAILED DESCRIPTION OF PREFERRED EMBODIMENTS

The present invention is directed toward a method and architecture for logically aggregating multiple tunnel endpoint devices.

Figure 1:
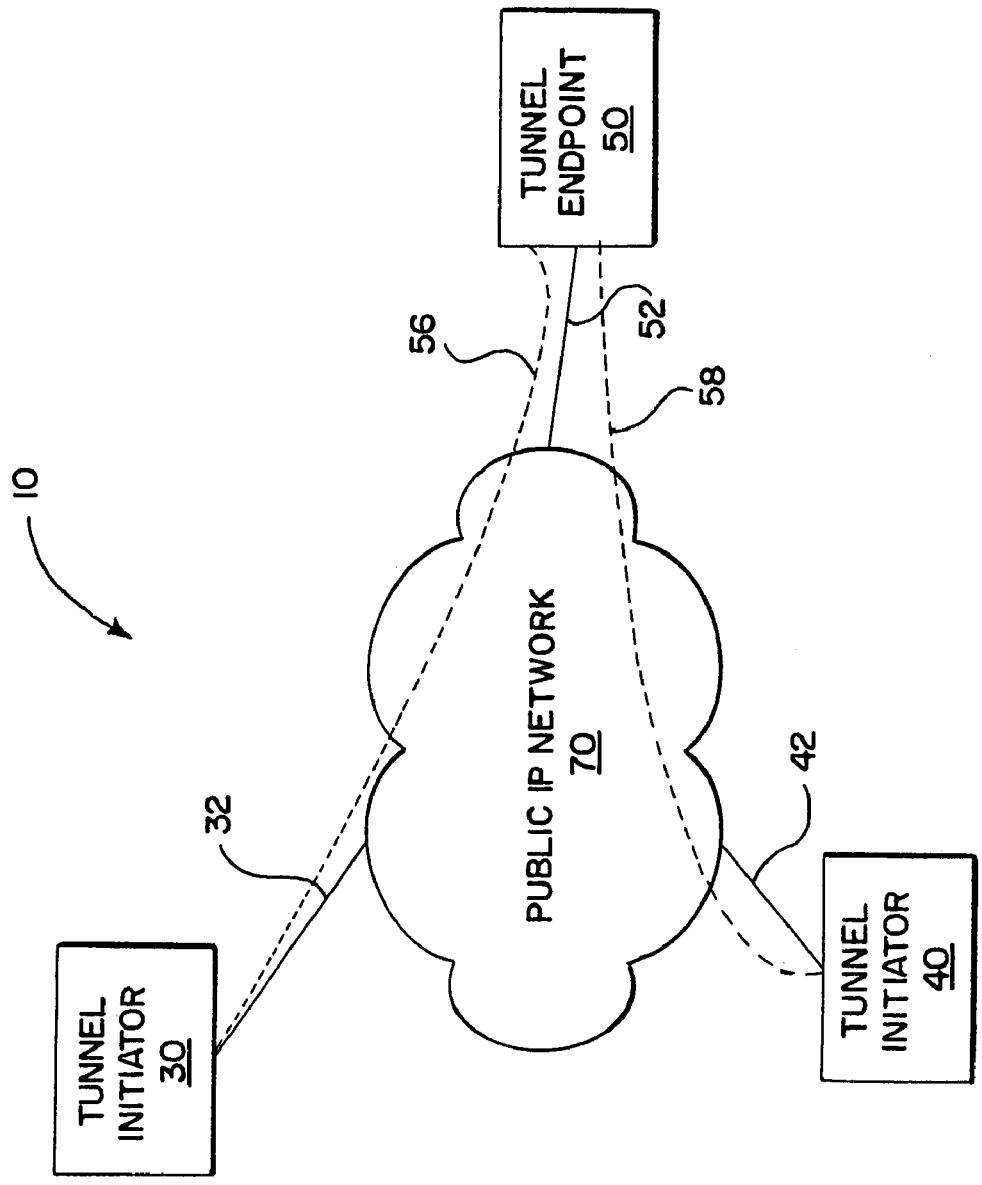
FIG. 1 is a functional block diagram illustrating a network architecture featuring tunnel connections from tunnel initiator devices through a public IP network to a tunnel endpoint device.
Figure 2:
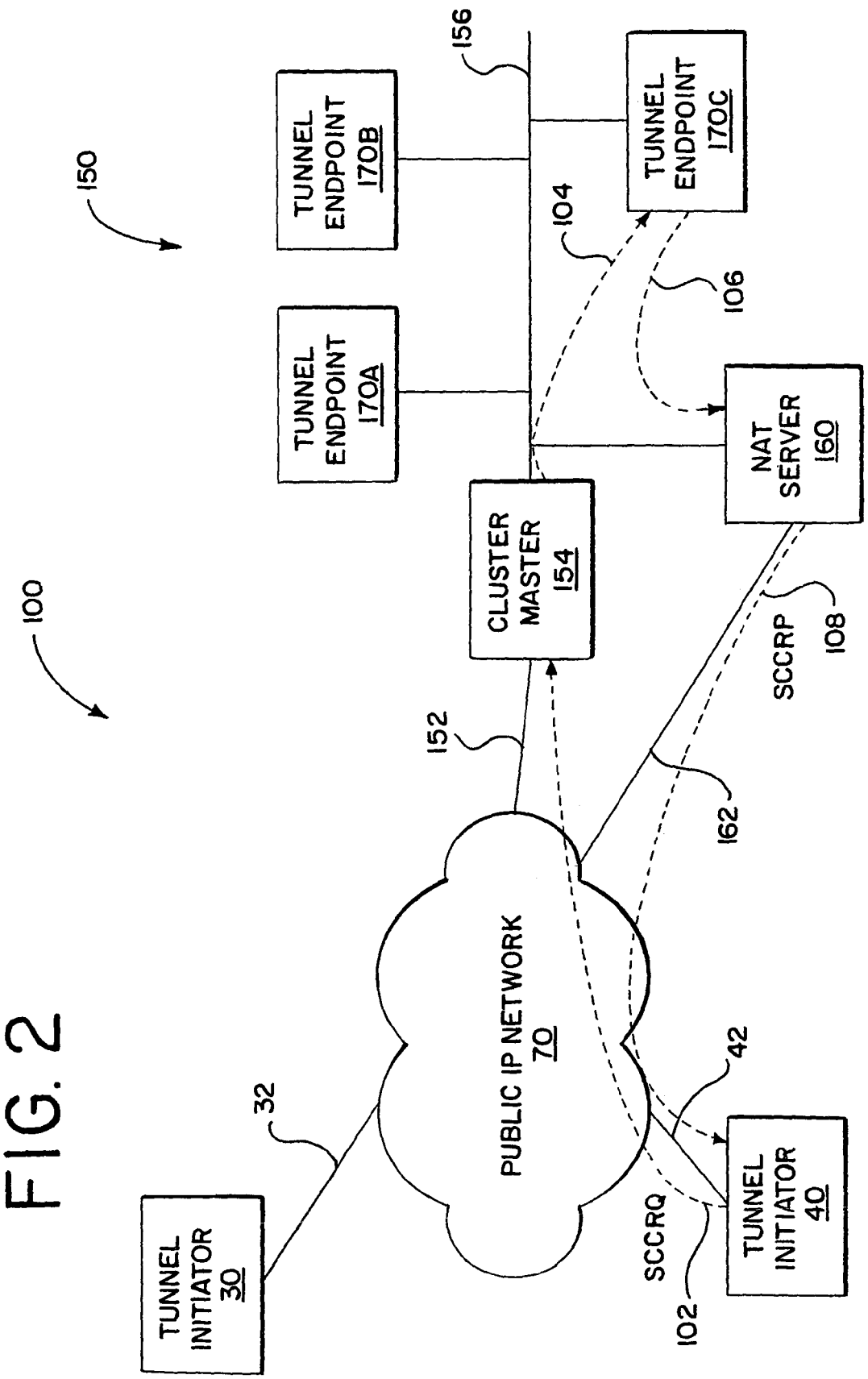
FIG. 2 is a functional block diagram illustrating a network architecture, according to an embodiment of the present invention, showing a cluster of tunnel endpoint devices operating in conjunction with a cluster master and a network address translation server.

FIG. 2 is a block diagram illustrating an embodiment of a network architecture 100 according to the present invention. Architecture 100 includes tunnel initiators 30 and 40 connected to public IP network 70. A cluster 150 according to the present invention is also connected to the public IP network via connection 152 to cluster master 154. Cluster 150 also includes a network address translation (NAT) server 160, such as a device conforming to RFC 2766, that is coupled to the rest of cluster 150 through a back-end local area network (LAN) 156. Also connected to LAN 156 are tunnel endpoint devices 170A, 170B and 170C.

One example of a tunnel endpoint device is a network access server, such as that described in the patent to Dale M. Walsh et al., U.S. Pat. No. 5,528,595, which is fully incorporated by reference herein and describes an integrated network access server suitable for use in the present invention. Such a device has been commercialized widely by 3Com Corporation (previously U.S. Robotics Corp.) under the trade designation Total Control™ Enterprise Network Hub. Network access servers similar in functionality, architecture and design are available from other companies, including Lucent Technologies, Cisco Systems, and others. The invention is suitable for implementation in network access servers from the above companies, and other similar devices.

The tunnel endpoint devices 170A, 170B and 170C can have only local addresses for routing traffic on LAN 156 or they can have global IP addresses for routing traffic over IP network 70. If the tunnel endpoint devices 170A, 170B and 170C have their own global IP addresses, then NAT server 160 is unnecessary. However, in the embodiment of FIG. 2, tunnel endpoint devices 170A, 170B and 170C have only local addresses and NAT server 160 is required to translate addresses between the LAN 156 and the IP network 70.

Cluster master 154 possesses a master IP address for cluster 150 that all tunnel initiator devices will use to initially contact the cluster. Thus, when tunnel initiator 40 sends out Start-Control-Connection-Request (SCCRQ) message 102 to initiate establishment of a tunnel connection, the destination address of the SCCRQ address is set to the master IP address for cluster 150. The SCCRQ message 102 will contain a tunnel ID value assigned by tunnel initiator 40 to the tunnel connection being set-up. See RFC 2661 for additional details.

Figure 3:
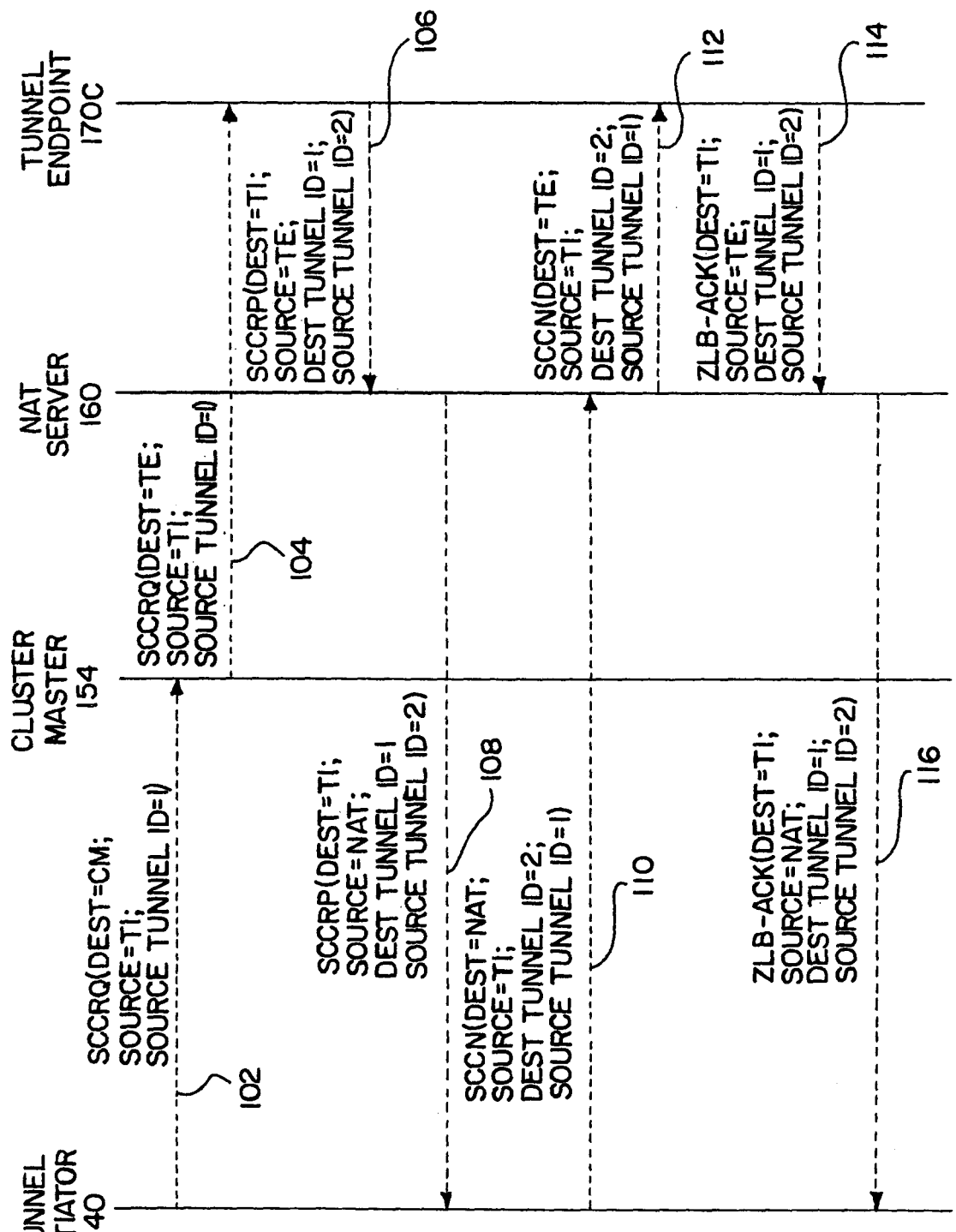
FIG. 3 is a message sequence diagram illustrating an example of message traffic, according to the present invention, related to establishing a tunnel control session between a tunnel initiator and a tunnel endpoint in the architecture of FIG. 2.

Also note that FIG. 3 is a message diagram illustrating an example of the message exchange taking place in the architecture of FIG. 2 in order to establish a tunnel connection and may be viewed in combination with FIG. 2 to further an understanding of the present invention. Thus, SCCRQ message 102 has a destination address field that is set to the IP address of cluster master 154 (dest=CM), a source address field that is set to the IP address of tunnel initiator 40, and a source tunnel ID field set to the tunnel ID value assigned to the tunnel connection by tunnel initiator 40 (source tunnel ID=1).

Cluster master 154 receives SCCRQ message 102 and determines which tunnel endpoint device 170A, 170B and 170C should receive the message. A variety of load-sharing approaches exist for tunnel endpoint device assignment, such as round-robin or leaky bucket. The preferred approach is for the cluster master 154 to receive load status messages from each tunnel endpoint device 170A, 170B and 170C and assign the SCCRQ message 102 to the device that currently has the lowest load and indicated by the load status messages.

Note that cluster master 154 can perform additional network management functions as well. For example, the cluster master 154 can keep track of tunnel endpoint devices that are out of service or temporarily inactive. Alternatively, the cluster master 154 can inactivate one or more tunnel endpoint devices if they are unnecessarily given the level of traffic on cluster 150. One of ordinary skill in the art will appreciate that the cluster master 154 can perform additional network management functions as well.

In the example of FIG. 2, tunnel endpoint device 170C has the lowest load level and cluster master 154 forwards the SCCRQ message 102 to tunnel endpoint device 170C. To forward SCCRQ message 102, cluster master 154 substitutes the local address of tunnel endpoint device 170C in LAN 156 into the destination address field of the SCCRQ message (dest=TE) and transmits the modified SCCRQ message 104 onto LAN 156.

In response to the SCCRQ message 104, tunnel endpoint device 170C formulates a Start-Control-Connection-Reply (SCCRP) message 106. The SCCRP message 106 includes the address of tunnel initiator 40 (dest=TI) as well as the tunnel ID value (dest tunnel ID=1) assigned to the tunnel connection by tunnel initiator 40 and contained within SCCRQ message 102. The SCCRP message 106 also includes a tunnel ID value (source tunnel ID=2) assigned to the tunnel connection by tunnel endpoint 170C. The SCCRP message 106 is then forwarded to NAT server 160 over LAN 156.

The NAT server 160 acts as a gateway for packets on LAN 156 that are addressed to destinations on IP network 70. NAT server 160 may advertise the addresses to which it can route packets over LAN 156 to the devices attached to LAN 156.

When NAT server 160 receives SCCRP message 106, it uses the message to create a table entry, as shown in Table 1 below. The table entry contains the local address for tunnel endpoint device 170C combined with a channel or port identifier, as assigned to the tunnel connection by tunnel endpoint 170C, along with the global IP address of tunnel initiator 40 combined with a channel or port identifier, as assigned by tunnel initiator 40. In the present example, the channel/port identifier at each end is the UDP port assigned by the device. Other protocols will employ other types of identifiers, such as a Virtual Channel Identifier (VCI) or a Virtual Path Identifier (VPI) for an Asynchronous Transfer Mode (ATM) network. Thus, the table entry creates a correspondence between the physical devices and local connections at each end of the tunnel connection. NAT server 160 then substitutes its own global IP address for the local IP address of tunnel endpoint device 170C in the source address field of the SCCRP message (source=NAT) and forwards the modified SCCRP message 108 to tunnel initiator 40.

TABLE 1

| FAR END IP ADDRESS | FAR END CHANNEL/ PORT | LOCAL END NET ADDRESS | LOCAL END CHANNEL/PORT |
|---|---|---|---|
| Global address for tunnel initiator 40. | (UDP port assigned by tunnel initiator 40). | Local address for tunnel endpoint 170C. | (UDP port assigned by tunnel endpoint 170C). |

When tunnel initiator 40 receives modified SCCRP message 108, it completes construction of a table entry, as shown in Table 2 below, for the tunnel connection. The table entry includes the address and connection identifier (i.e. MAC port) for the client and the tunnel ID that it has assigned for the connection (tunnel ID 1). The table entry also contains the address from the source address field of the SCCRP message (the global IP address of NAT server 160) along with the connection identifier (i.e. UDP port), and the tunnel ID assigned to the connection by the tunnel endpoint (tunnel ID 2). The use of the value from the source address field of the SCCRP message 108 to construct the table is typically a standard part of the L2TP protocol and the present invention, therefore, typically will not require modification of the L2TP functionality in the tunnel initiator devices.

TABLE 2

| CLIENT ADDRESS | TUNNEL ID | FAR END ADDRESS | FAR END TUNNEL ID |
|---|---|---|---|
| Local address for client connected to tunnel initiator 40, including MAC address/port identifier for client. | Tunnel ID 1 (as assigned by tunnel initiator 40 and inserted into source Tunnel ID field of SCCRQ message). | Global address for NAT 160, including port/channel identifier on NAT. | Tunnel ID 2 (as assigned by tunnel endpoint 170C and obtained from source Tunnel ID field of SCCRP message). |

Tunnel initiator 40 then sends a Start-Control-Connection-Connected (SCCN) message 110 back to the NAT server 160. NAT server 160 receives the SCCN message and uses the source address (source=TI) and connection identifier (i.e. UDP port) to search the table for the entry for the connection. The local address for tunnel endpoint 170C is obtained from the tunnel entry and the SCCN message is forwarded via LAN 156 to the tunnel endpoint device as modified SCCN message 112. At this point, the control connection for the tunnel connection between tunnel initiator 40 and tunnel endpoint 170C is established. If no messages are waiting in the queue at tunnel endpoint 170C, then a Zero-Length-Body (ZLB) acknowledge message 114 is sent to tunnel initiator 40 via NAT server 160 as modified ZLB-ACK message 116.

With the control session established for the tunnel connection between tunnel initiator 40 and tunnel endpoint 170C, a call session can be established to carry traffic between a client connected to tunnel initiator 40 and tunnel endpoint 170C. When tunnel initiator 40 receives an L2TP packet from NAT server 160 with destination port value equal to the UDP port assigned to the connection by tunnel endpoint 170C, it will strip off the L2TP headers and use the Table 2 entry for the tunnel to route the packet to the remote client. Similarly, packets received from the remote client are encapsulated in L2TP with the destination port set to the UDP port assigned by tunnel initiator 40 and forwarded to NAT server 160. NAT server 160 will look at the source address and port for the packets, search Table 1 for a matching entry, and, using the matching entry to identify the proper tunnel endpoint device, forward the packets to tunnel endpoint 170C. Tunnel endpoint 170C will receive the packets, strip off the L2TP and process the remaining portion of the packet as if it had been received on a local link interface, such as a point-to-point protocol (PPP) interface. See RFC 2661 for additional information on L2TP processing.

Figure 4:
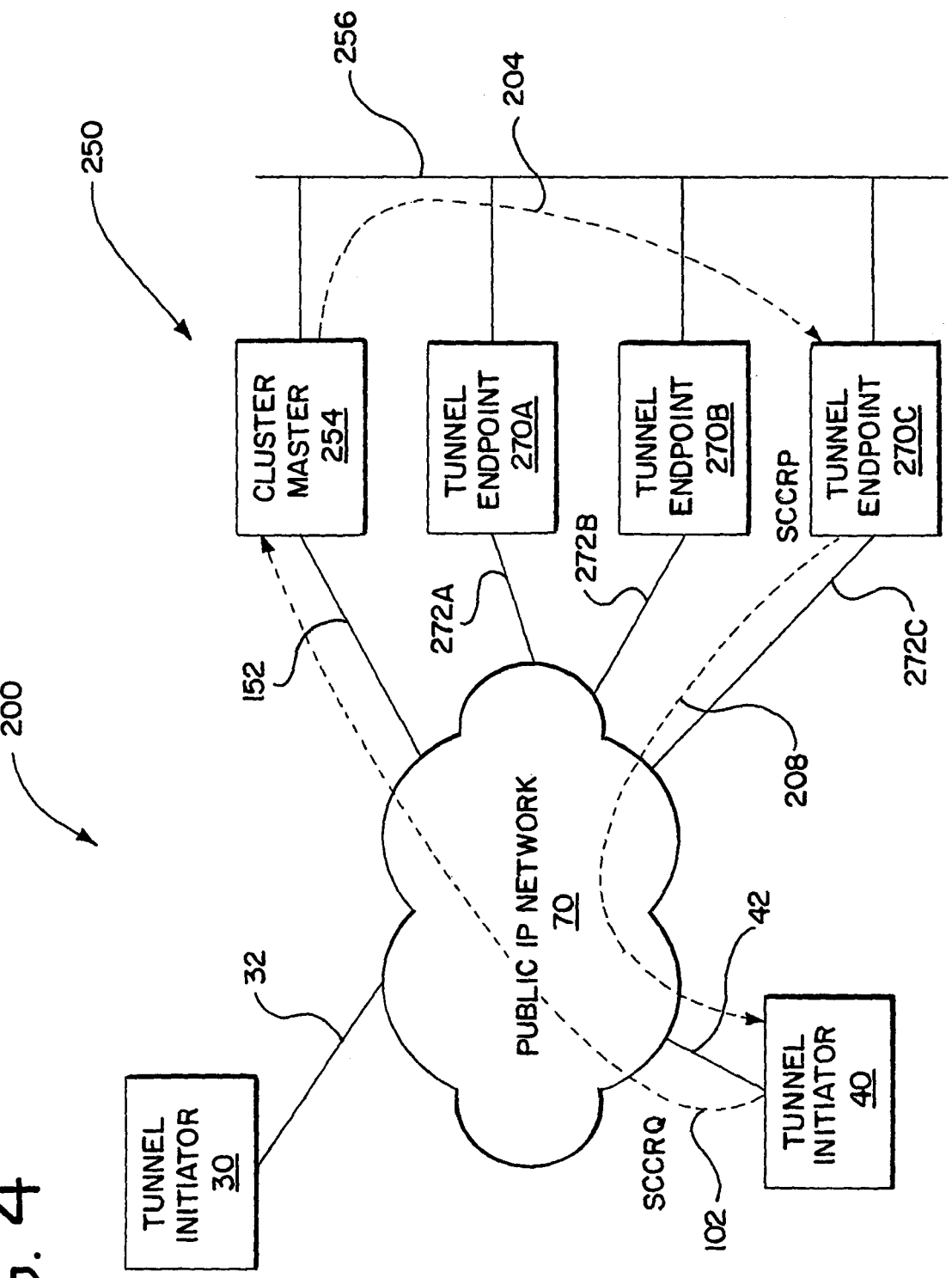
FIG. 4 is a functional block diagram illustrating yet another network architecture, according to an embodiment of the present invention, where each tunnel endpoint device in a cluster has a unique address for routing on a public IP network.

FIG. 4 is a functional block diagram illustrating another architecture 200 that includes a cluster 250 according to the present invention. Cluster 250 includes cluster master 254, which has the master IP address for the cluster, that is connected to tunnel endpoint devices 270A, 270B and 270C via LAN 256. Tunnel endpoint devices 270A, 270B and 270C are connected to IP network 70 via communications links 272A, 272B and 272C, respectively, and each has its own global IP address.

Just as in FIGS. 2 and 3, tunnel initiator address SCCRQ message 102 to the master IP address held by cluster master 254. Cluster master 254 determines which of the tunnel endpoint devices 270A, 270B and 270C is to service the tunnel connection request and forwards the SCCRQ message 102 to the selected device. In the example of FIG. 4, cluster master 254 selects tunnel endpoint device 270C, substitutes the local address for tunnel endpoint 270C into the destination field of SCCRQ message 102 (dest=local TE) and transmits modified message 204 over LAN 256 to tunnel endpoint 270C.

In response to the SCCRQ message 204, tunnel endpoint device 270C formulates a Start-Control-Connection-Reply (SCCRP) message 206. The SCCRP message 206 includes the address of tunnel initiator 40 (dest=TI) as well as the tunnel ID value (dest tunnel ID=1) assigned to the tunnel connection by tunnel initiator 40 and contained within SCCRQ message 102. The SCCRP message 206 also includes the global IP address for tunnel endpoint 270C (source=globalTE) and a tunnel ID value (source tunnel ID=2) assigned to the tunnel connection by tunnel endpoint 270C. The SCCRP message 206 is then transmitted over IP network 70 to tunnel initiator 40.

When tunnel initiator 40 receives SCCRP message 208, it creates a table entry, as shown in Table 3 below, for the tunnel connection that includes its own tunnel ID for the connection (tunnel ID 1), the address from the source address field of the SCCRP message (the global IP address of tunnel endpoint device 270C) along with the UDP port, and the tunnel ID assigned to the connection by the tunnel endpoint (tunnel ID 2). The use of the value from the source address field of the SCCRP message 208 to construct the table is typically a standard part of the L2TP protocol and the present invention, therefore, typically will not require modification of the L2TP functionality in the tunnel initiator devices.

TABLE 3

| CLIENT ADDRESS | TUNNEL ID | FAR END ADDRESS | FAR END TUNNEL ID |
| --- | --- | --- | --- |
| Local address for client connected to tunnel initiator 40. | Tunnel ID 1 (as assigned by tunnel initiator 40). | Global address for tunnel endpoint 270C. | Tunnel ID 2 (as assigned by tunnel endpoint 270C). |

Tunnel initiator 40 then sends a Start-Control-Connection-Connected (SCCN) message 210 back to the tunnel endpoint 270C using the global IP address for the endpoint device and the UDP port for the tunnel connection. Tunnel endpoint device 270C receives the SCCN message and checks the tunnel ID field against its own connection data for the tunnel connection. At this point, the control connection for the tunnel connection between tunnel initiator 40 and tunnel endpoint 270C is established. If no messages are waiting in the queue at tunnel endpoint 270C, then a Zero-Length-Body (ZLB) acknowledge message 214 is sent to tunnel initiator 40 with the source address field set to the global IP address of tunnel endpoint 270C (source=globalTE). With the control session established for the tunnel connection between tunnel initiator 40 and tunnel endpoint 270C, a call session can be established to carry traffic between a client connected to tunnel initiator 40 and tunnel endpoint 270C, as described above and in RFC 2661.

An advantage of the cluster 250 of FIG. 4 is that all the tunnel endpoint devices 270A, 270B and 270C are connected to IP network 70. In the event of a failure of cluster master 254, another one of the tunnel endpoint devices 270A, 270B and 270C can take over as cluster master and process incoming tunnel connection request to the master IP address. This can improve the reliability of cluster 250.

The protocol according to the present invention supports the deterministic selection of an endpoint for connections having multiple origination points. Although the present invention is described in the context of an L2TP tunnel, the present invention is applicable to any communications link where it is desirable to provide for multiple tunnel endpoint server devices to operate as a single logical entity.

It should be understood that the programs, processes, methods, systems and apparatus described herein are not related or limited to any particular type of computer apparatus (hardware or software), unless indicated otherwise. Various types of general purpose or specialized computer apparatus may be used along with the present invention or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, variations may be made in the message flow scenarios other than those described, and more or fewer elements or components may be used in the block diagrams. In addition, the present invention can be practiced with software, hardware, or a combination thereof.

The claims should not be read as limited to the described order or elements unless stated to that effect. Therefore, all embodiments that come within the scope and spirit of the following claims and equivalents thereto are claimed as the invention.

We claim:

1. A tunnel endpoint device comprising:
a network interface connected to a local area network having a cluster of tunnel endpoint devices, the tunnel endpoint device being one of the cluster, the network interface configured to receive a Start-Control-Connection-Request (SCCRQ) message via the local area network to initiate establishment of a tunnel connection, wherein the SCCRQ includes a destination address field modified to be set to a local address of the tunnel endpoint device and a tunnel ID value assigned by a tunnel initiator to the tunnel connection being set-up;
means for forming a Start-Control-Connection-Reply (SCCRP) message having an address of the tunnel initiator, the tunnel ID value assigned to the tunnel connection by the tunnel initiator, and a tunnel ID value assigned to the tunnel connection by the tunnel endpoint device; and
means for transmitting the SCCRP message to a network address translation server via the network interface.

2. The tunnel endpoint device of claim 1, further comprising means for receiving a Start-Control-Connection-Connected (SCCN) message to establish a tunnel connection between the tunnel initiator and the tunnel endpoint device.

3. The tunnel endpoint device of claim 1, further comprising means for forming load status messages that indicate a current traffic load of the tunnel endpoint device.

4. A cluster master device comprising:
a first interface coupled to a first network having a plurality of network devices; and
a second interface for communicating with a second network,
wherein the cluster master device has a master global address that is unique on the second network, and
wherein the cluster master device is configured to receive from the second network tunnel connection request messages having the master global address in a destination address field and, for each tunnel connection request message received:
(i) select one of the plurality of network devices;
(ii) insert a local address for the selected network device into the destination address field of the received tunnel connection request message; and
(iii) transmit the received tunnel connection request message as modified over the first network interface onto the first network.

5. The cluster master device of claim 4, wherein the cluster master device selects one of the plurality of network devices based on a traffic load of each network device.

6. The cluster master device of claim 4, wherein the cluster master device receives load status messages from each network device and assigns the received tunnel connection request message to the network device that currently has the lowest traffic load as indicated by the load status messages.

7. The cluster master device of claim 4, wherein the tunnel connections are Layer 2 Tunneling Protocol (L2TP) connections.

8. The cluster master device of claim 4, wherein the first network is a local area network (LAN) and the second network is an Internet protocol (IP) network.

9. The cluster master device of claim 4, wherein the tunnel connection request messages include a source address field set to an IP address of a tunnel initiator, and a source tunnel ID field set to a tunnel ID value assigned to the tunnel connection by the tunnel initiator.

10. The cluster master device of claim 4, wherein the cluster master device keeps track of network devices that are out of service or temporarily inactive.

11. A method for terminating tunnel connections comprising:
receiving a tunnel connection request message;
receiving a load status message from each tunnel endpoint device of a plurality of tunnel endpoint devices on a network;
based on the load status messages, selecting a tunnel endpoint device to receive the tunnel connection request message; and
assigning the tunnel connection request message to the selected tunnel endpoint device.

12. The method of claim 11, wherein selecting the tunnel endpoint device to receive the tunnel connection request message comprises:
based on the load status messages, determining which tunnel endpoint device has the lowest load; and
selecting the tunnel endpoint device that has the lowest load.

13. The method of claim 11, wherein assigning the tunnel connection request message to the selected tunnel endpoint device comprises:
inserting a local address for the selected tunnel endpoint device into a destination address field of the tunnel connection request message; and
transmitting the tunnel connection request message as modified onto the network.

14. A method for terminating tunnel connections comprising:
receiving tunnel connection request messages having a master global address in a destination address field and, for each tunnel connection request message received:
selecting one of a plurality of network devices connected to a network;
inserting a local address for the selected network device into the destination address field of the received tunnel connection request message; and
transmitting the received tunnel connection request message as modified onto the network.

15. The method of claim 14, further comprising transmitting a tunnel set-up reply message over the network, wherein the tunnel set-up reply message includes a source address field having the address of the selected network device.

16. The method of claim 15, wherein transmitting the tunnel set-up reply message over the network comprises:
transmitting the tunnel set-up reply to a network address translation (NAT) server;
replacing the address of the selected network device in the source address field of the tunnel set-up reply message with a global address for the NAT server;
storing a table entry accessible to the NAT server that relates the global address to the address of the selected network device; and
transmitting the tunnel set-up reply message onto the network.

17. The method of claim 14, wherein selecting one of the plurality of network devices connected to the network comprises selecting one of the plurality of network devices based upon a traffic load on each of the network devices.

18. The method of claim 14, further comprising receiving load status messages from each of the plurality of network devices.

19. The method of claim 18, wherein selecting one of the plurality of network devices connected to the network comprises selecting one of the plurality of network devices based upon which network device currently has the lowest load as indicated by the load status messages.

20. The method of claim 14, wherein the tunnel connections are Layer 2 Tunneling Protocol (L2TP) connections.

* * * * *